US009448932B2

(12) United States Patent
Jenkins et al.

(10) Patent No.: US 9,448,932 B2
(45) Date of Patent: Sep. 20, 2016

(54) SYSTEM FOR CACHING DATA

(71) Applicant: Amazon Technologies, Inc., Reno, NV (US)

(72) Inventors: Jonathan A. Jenkins, Seattle, WA (US); Mark S. Baumback, Seattle, WA (US); Ryan J. Snodgrass, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/451,324

(22) Filed: Aug. 4, 2014

(65) Prior Publication Data
US 2014/0344520 A1 Nov. 20, 2014

Related U.S. Application Data

(60) Continuation of application No. 13/494,682, filed on Jun. 12, 2012, now Pat. No. 8,799,576, which is a division of application No. 12/059,406, filed on Mar. 31, 2008, now Pat. No. 8,219,752.

(51) Int. Cl.
*G06F 12/00* (2006.01)
*H04L 29/08* (2006.01)
*G06F 17/30* (2006.01)
*G06F 12/08* (2016.01)
*G06Q 30/06* (2012.01)

(52) U.S. Cl.
CPC ....... *G06F 12/0802* (2013.01); *G06F 12/0815* (2013.01); *G06F 17/30902* (2013.01); *G06Q 30/06* (2013.01); *H04L 67/2852* (2013.01); *H04L 67/2885* (2013.01); *G06F 12/0866* (2013.01); *G06F 2212/163* (2013.01)

(58) Field of Classification Search
CPC .......... G06F 12/0802; G06F 12/0815; G06F 12/0866; G06F 2212/163; G06F 17/30902; H04L 67/2885
See application file for complete search history.

(56) References Cited

U.S. PATENT DOCUMENTS

| | | | |
|---|---|---|---|
| 5,842,210 A * | 11/1998 | Chen et al. | |
| 6,496,932 B1 | 12/2002 | Trieger | |
| 6,789,170 B1 | 9/2004 | Jacobs | |
| 6,934,720 B1 | 8/2005 | Jacobs | |
| 7,890,571 B1 | 2/2011 | Kriegsman | |
| 7,970,816 B2 | 6/2011 | Chess | |
| 8,799,576 B1 | 8/2014 | Jenkins | |
| 2004/0236824 A1 | 11/2004 | Millington | |
| 2005/0120061 A1* | 6/2005 | Kraft | 707/203 |
| 2005/0165828 A1* | 7/2005 | Lango et al. | 707/102 |
| 2006/0167979 A1 | 7/2006 | Fuchs | |
| 2006/0200631 A1 | 9/2006 | Seki et al. | |

OTHER PUBLICATIONS

Office Action dated May 9, 2011, U.S. Appl. No. 12/059,406; 7 pages.
Non-Final Office Action dated Aug. 9, 2011, U.S. Appl. No. 12/059,406; 19 pages.
Final Office Action dated Dec. 30, 2011, U.S. Appl. No. 12/059,406; 18 pages.

(Continued)

*Primary Examiner* — Aracelis Ruiz
(74) *Attorney, Agent, or Firm* — Lee & Hayes, PLLC

(57) ABSTRACT

A system for caching data in a distributed data processing system allows for the caching of user-modifiable data (as well as other types of data) across one or multiple entities in a manner that prevents stale data from being improperly used.

14 Claims, 11 Drawing Sheets

(56) References Cited

OTHER PUBLICATIONS

Notice of Allowance dated Mar. 19, 2012, U.S. Appl. No. 12/059,406; 9 pages.
Non-Final Office Action dated Feb. 4, 2013, U.S. Appl. No. 13/494,682; 21pages.
Final Office Action dated Aug. 27, 2013, U.S. Appl. No. 13/494,682; 18 pages.
Non-Final Office Action dated Dec. 20, 2013, U.S. Appl. No. 13/494,682; 6 pages.
Notice of Allowance dated Jul. 11, 2014, U.S. Appl. No. 13/494,682;; 9 pages.

* cited by examiner

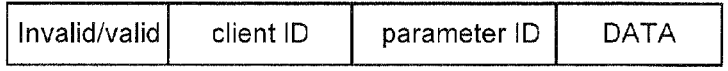
Figure 4
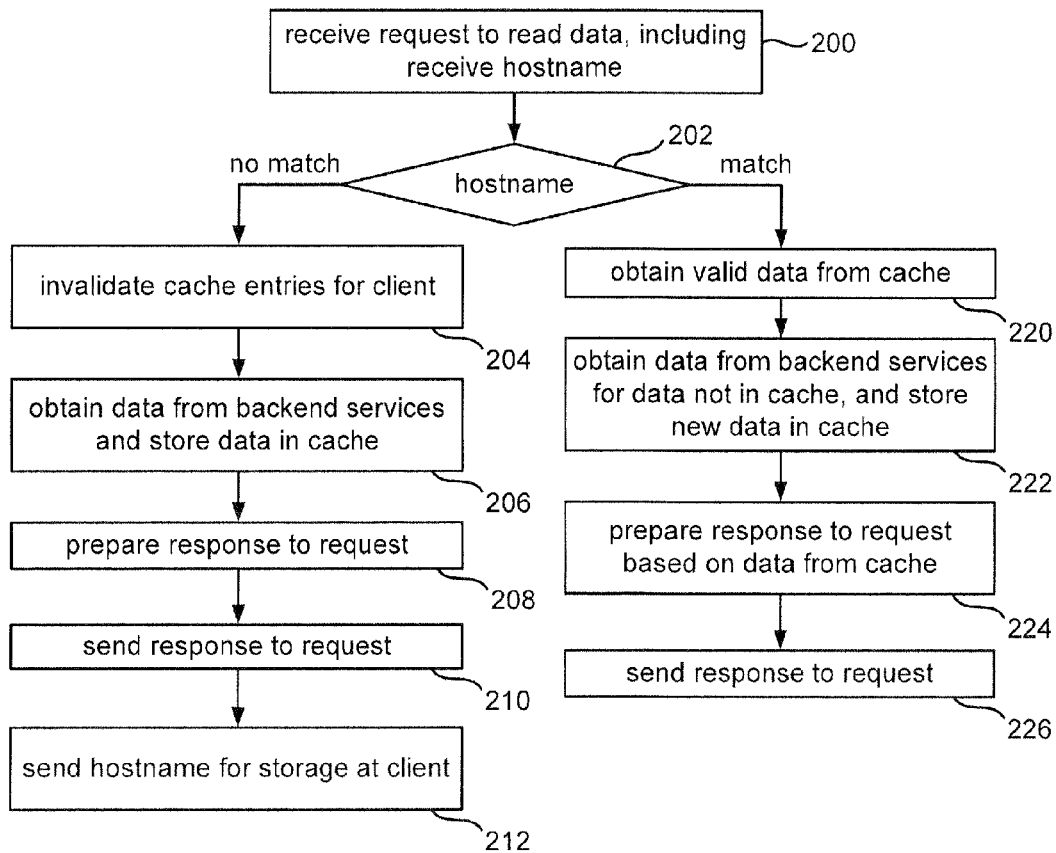
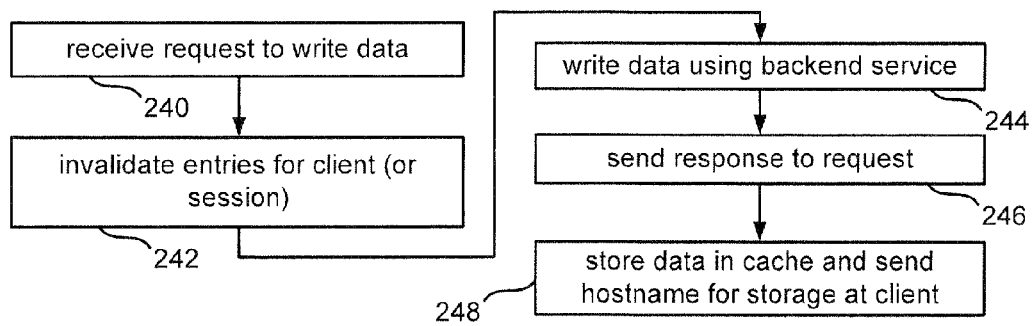

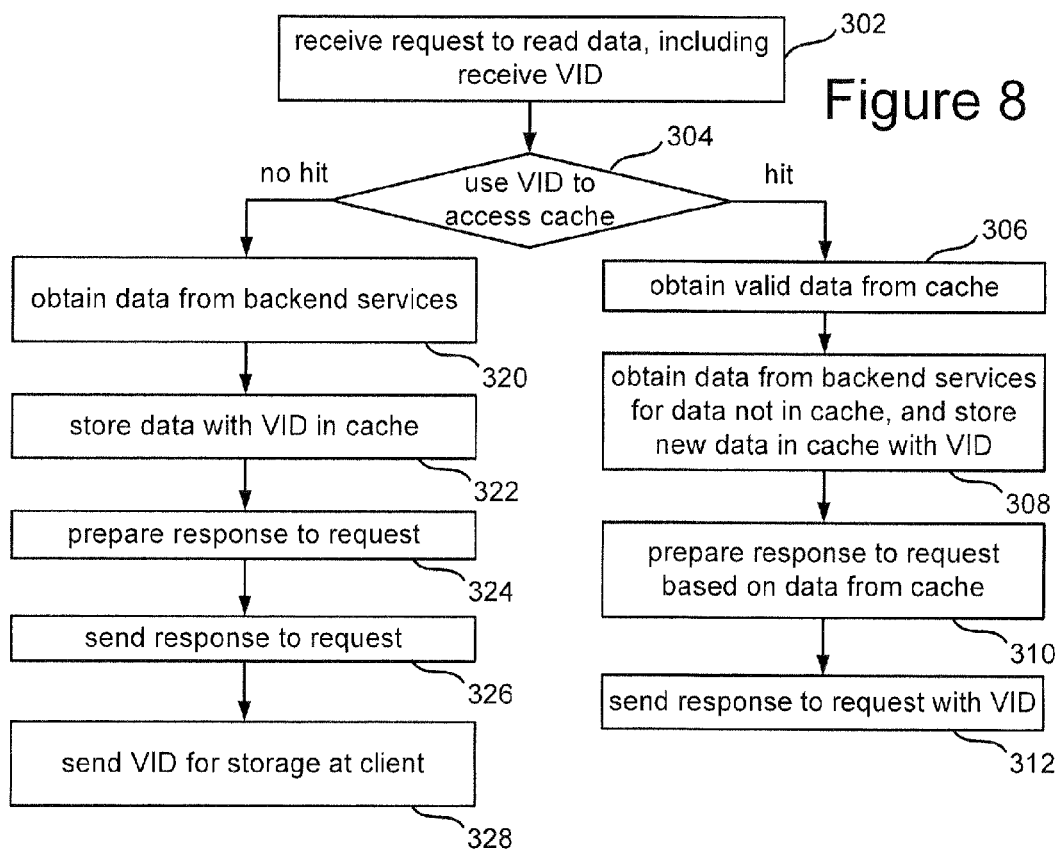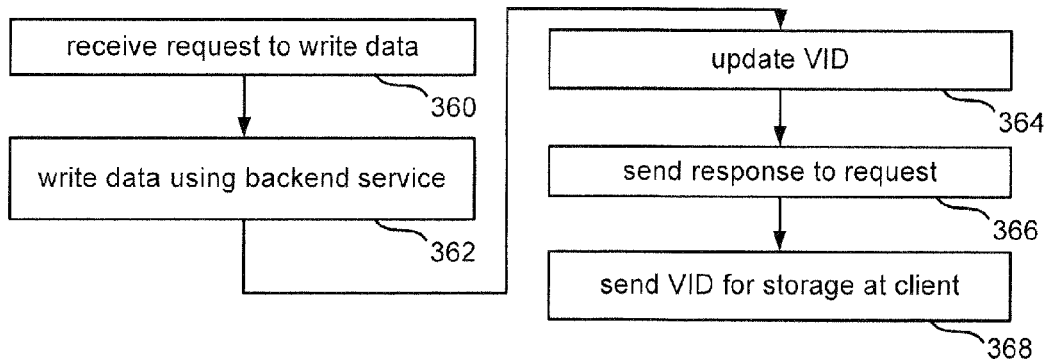

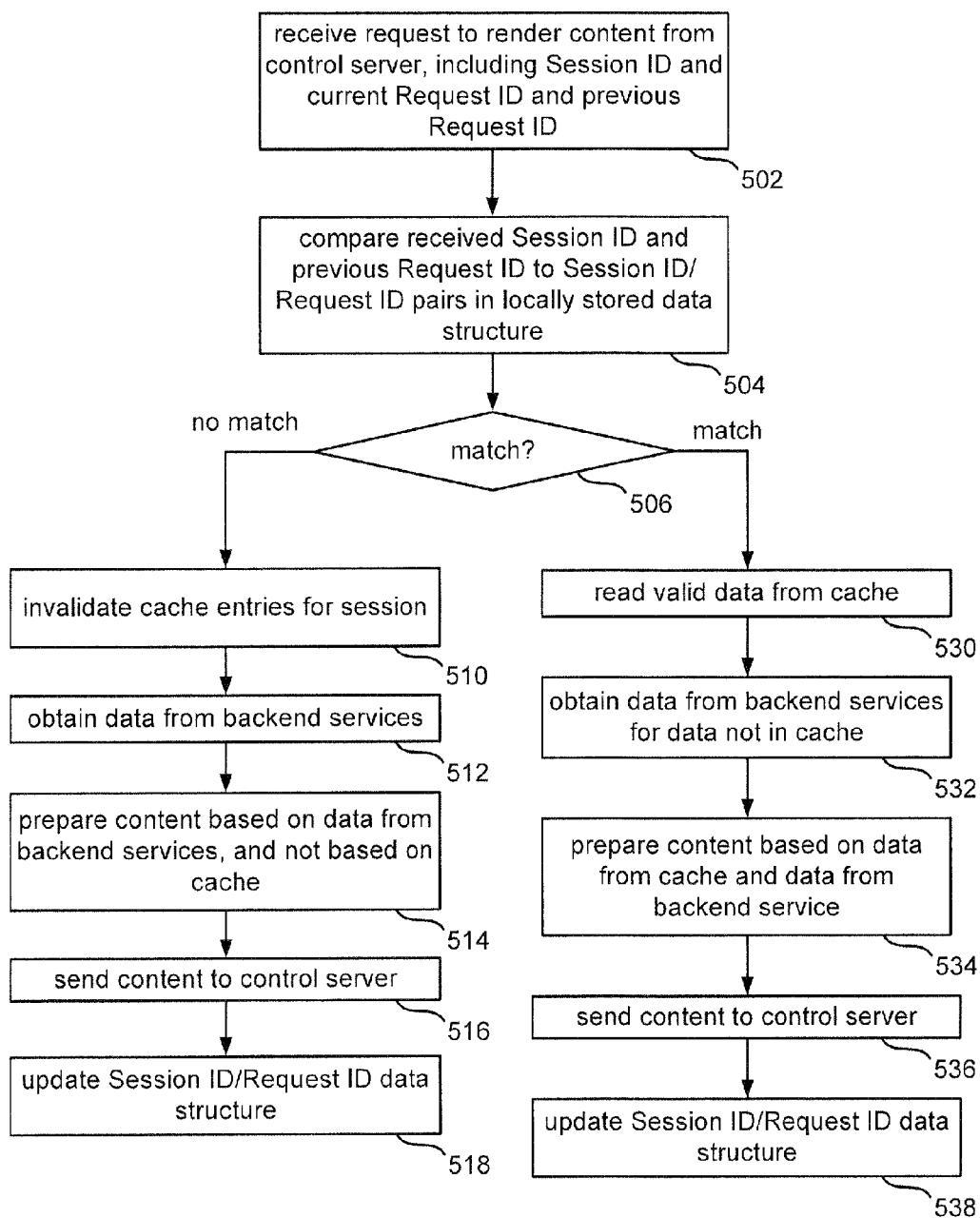

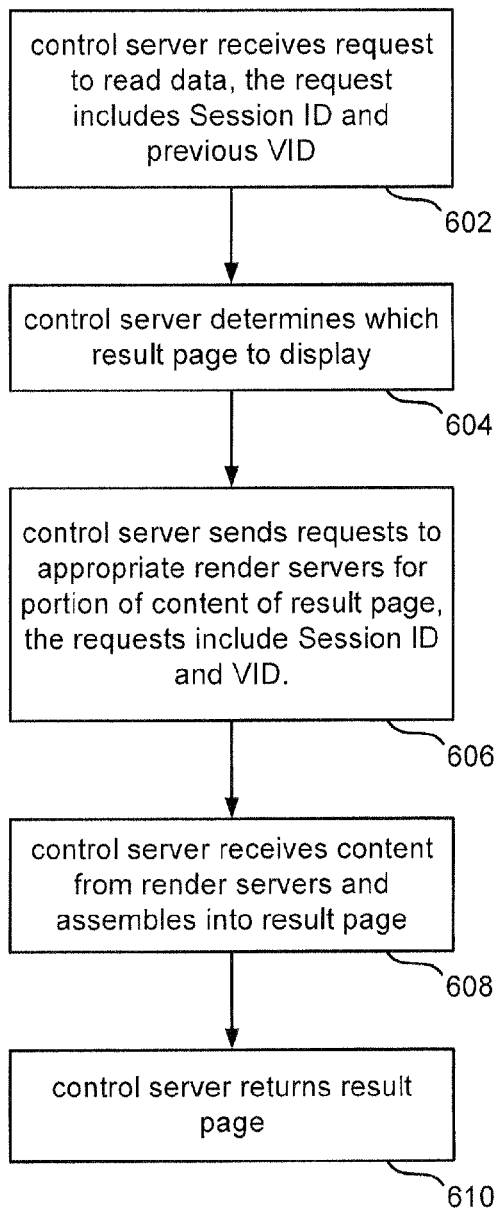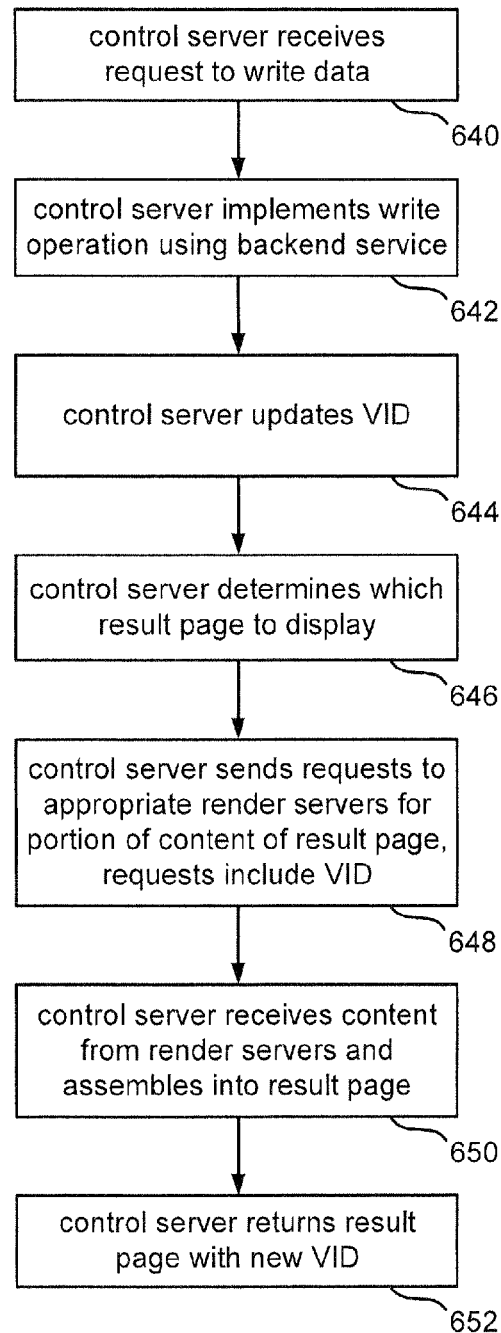

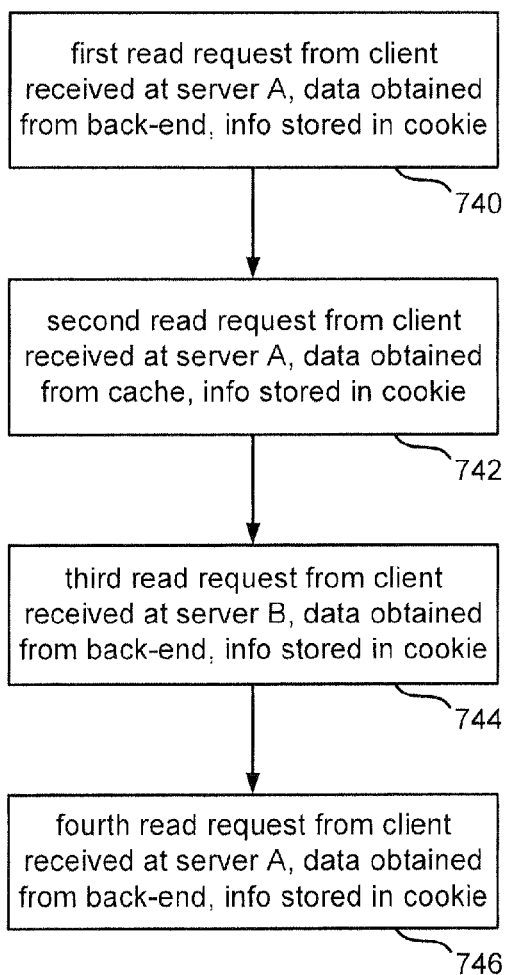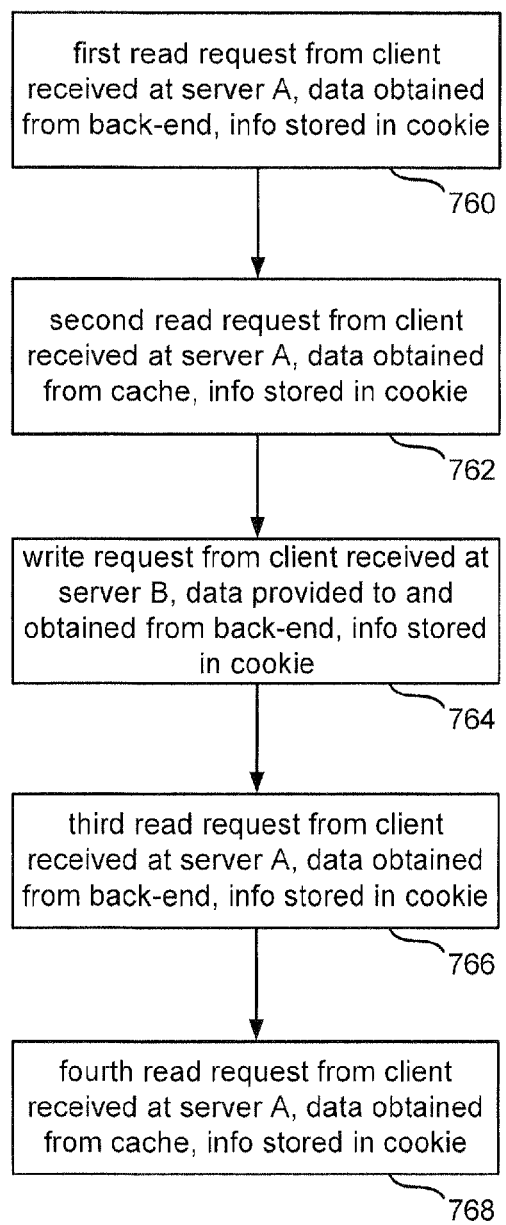

SYSTEM FOR CACHING DATA

CLAIM OF PRIORITY

This application is a continuation of U.S. patent application Ser. No. 13/494,682, now U.S. Pat. No. 8,799,576, filed on Jun. 12, 2012, entitled "SYSTEM FOR CATCHING DATA," which is a divisional application of U.S. patent application Ser. No. 12/059,406, "SYSTEM FOR CACHING DATA," now U.S. Pat. No. 8,219,752, filed on Mar. 31, 2008, each of which is hereby incorporated by reference in its entirety.

BACKGROUND

A cache is a collection of data duplicating original values stored elsewhere, where the original data is expensive to fetch (e.g., owing to longer access time) compared to the cost of reading the cache. In many instances, a cache is a temporary storage area where frequently accessed data can be stored for rapid access. Once the data is stored in the cache, future use can be made by accessing the cached copy rather than the original data, so that the average retrieval cost is less expensive.

Despite the benefits of a cache, some distributed data processing systems do not employ a cache for user-modifiable data. In the context of the technology described herein, user-modifiable data is any data keyed off an identification of a customer or session that a customer is allowed to modify solely through the use of the distributed data processing system. Examples of user-modifiable data include user profile information on an identity server or other corporate software system, shopping cart contents on a website, personal customer information on any of various types of web-based and non-web based software systems, etc.

Although the user-modifiable data described above has a low rate of change, it is often not cached because the data processing systems have a distributed front-end that makes it difficult to maintain consistency between multiple caches and the back-end repository of data. If the user changes the user-modifiable data with one of the front-end servers in a system that has multiple front-end servers that share the load of requests and cache the user-modifiable data, the data in the cache of the other front end servers will become stale. Consider the case where a customer adds an item to their shopping cart. The updated shopping cart contents must be immediately available on the web site or it would appear that the item was not actually added to the shopping cart. From the point of view of the customer, a stale cache hit is unacceptable.

BRIEF DESCRIPTION OF THE DRAWINGS

The components in the drawings are not necessarily to scale relative to each other. Like reference numerals designate corresponding parts throughout the several views.

FIG. 4 depicts data stored in a cache.

FIG. 5 is a flow chart describing one embodiment of a process for responding to a request to read data that utilizes a cache.

FIG. 6 is a flow chart describing one embodiment of a process for responding to a request to write data that utilizes a cache.

FIG. 7 depicts data stored in a cache.

FIG. 8 is a flow chart describing one embodiment of a process for responding to a request to read data that utilizes a cache.

FIG. 9 is a flow chart describing one embodiment of a process for responding to a request to write data that utilizes a cache.

FIG. 13 is a flow chart describing one embodiment of a process performed by a rendering server to respond to a request to read data.

FIG. 14 is a flow chart describing one embodiment of a process performed by a control server to respond to a request to read data.

FIG. 15 is a flow chart describing one embodiment of a process performed by a control server to respond to a request to write data.

FIG. 17 is a flow chart describing one embodiment of a process for caching data in conjunction with various read requests.

FIG. 18 is a flow chart describing one embodiment of a process for caching data in conjunction with various read and write requests.

DETAILED DESCRIPTION

Figure 1:
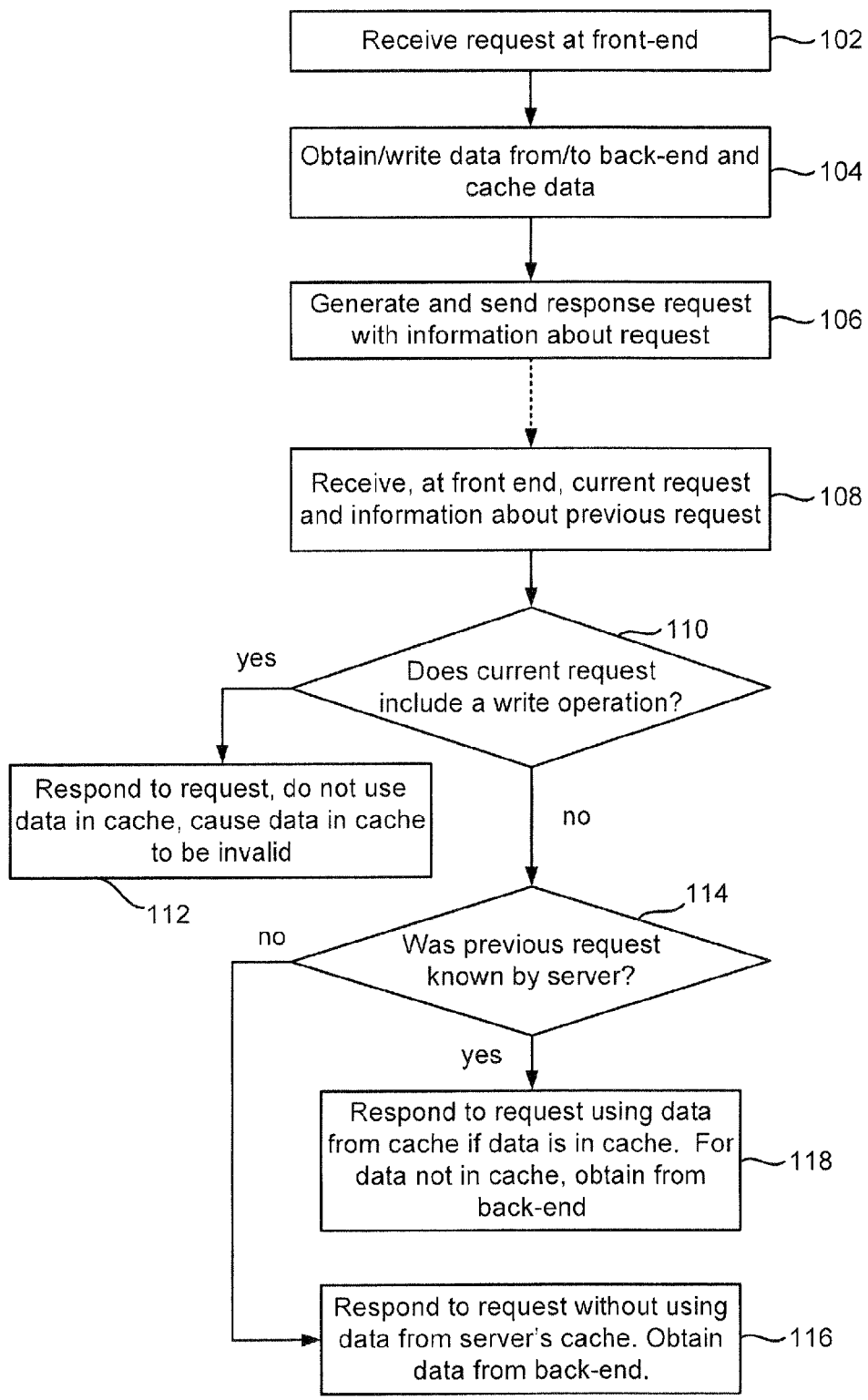
FIG. 1 is a flow chart describing one embodiment of a process for caching data.

The technology described herein provides a system for caching data in a distributed data processing system that allows for the caching of user-modifiable data (as well as other types of data) across one or multiple entities in a manner that prevents stale data from being improperly used.

One embodiment of the technology described herein includes inserting a first set of data into a cache of a first entity. The first set of data includes at least a subset of a second set of data maintained by a second entity. The process further includes receiving, at the first entity, a current data request corresponding to the second set of data and information about a previous request corresponding to the second set of data. A response to the current data request is provided using the first set of data in the cache if the previous request was known to the first entity and the current data request corresponds to the first set of data in the cache. At least a portion of the second set of data is obtained from the second entity and a response to the current data request is provided based on the portion of the second set of data from the second entity if the previous request was not known to the first entity.

One embodiment includes receiving a first request at a first entity for a first set of data, obtaining the first set of data from a second entity, storing the first set of data in a cache for the first entity, responding to the first request using the first set of data including sending the first set of data and sending a first identification of a version of the first set of data, storing the first identification of a version in a storage device accessible to the first entity, receiving a second request for at least a portion of the first set of data such that the second request is received at the first entity and the receiving of the second request includes receiving version information for the first set of data, determining whether the version information matches the first identification of the version, responding to the second request using the first set of data in the cache if the version information matches the first identification of the version, and obtaining a new copy of the first set of data from the second entity and responding to the second request using the new copy if the version information does not match the first identification of the version.

One embodiment includes inserting a first set of data into a cache of a first entity. The first set of data includes at least a subset of a second set of data maintained by a different entity. The process further includes receiving a current request to read at least a portion of the second set of data, receiving (with the current request) information about a previous request for the second set of data, determining whether the previous request was known to the first entity based on the received information about the previous request, causing the first set of data in the cache to be invalid if it was determined that the previous request was not known to the first entity, responding to the current request based on at least a subset of the first set of data in the cache that corresponds to the current request if the first set of data in the cache is valid, and obtaining at least a portion of the second set of data from the different entity and responding to the current request based on the obtained portion of the second set of data if the current request seeks information that does not correspond to valid data in the cache.

One embodiment includes one or more processor readable storage devices having processor readable code stored thereon. The processor readable code programs one or more processors to perform a method comprising inserting information corresponding to a first set of data into a cache of a first entity, receiving (at the first entity) a current data request corresponding to at least a portion of the first set of data and information about a previous request corresponding to the first set of data, invalidating the information in the cache if the previous request was not known to the first entity, and responding to the data request using valid information, if any, in the cache.

One embodiment includes one or more back-end servers and a plurality of front-end servers in communication with the back-end servers. The one or more back-end servers include one or more data stores. Each of the plurality of front-end servers includes a cache for storing copies of data on the one or more data stores. The front-end servers respond to current data requests using data in the respective caches if previous requests were known to responding front-end servers and the current data requests correspond to the data in the respective caches. The front-end servers obtain new copies of data in the respective caches from the one or more back-end servers and respond to current data requests based on the new copies if previous requests were not known to responding front-end servers.

FIG. 1 is a flow chart describing one embodiment of a process for caching data in a data processing system that allows for the caching of user-modifiable data (as well as other types of data) across one or multiple entities in a manner that prevents stale data from being improperly used. The process of FIG. 1 can be used in a system that includes a front-end service and a back-end service, where the front-end service is used to interact with the user and the back-end service is used to maintain data and provide application logic. Some architectures use multiple servers that are load balanced to implement the front-end service. The front-end service and the back-end service may be implemented in many types of configurations. For example, the front-end service and the back-end service may be part of the same data center/computing location or distributed among different data centers. Alternatively, the front-end service may be implemented in edge servers of a Content Delivery Network ("CDN") while the back-end service operates as an origin server. The technology described herein allows each (or a subset) of the servers of the front-end service to cache data from the back-end service in a manner that prevents stale data from being improperly used.

In one embodiment, in order to guarantee a low stale cache hit rate, the server will only read user-modifiable data from its cache when the server knows the data is consistent with the back-end data store. The question of consistency can be answered in real time (for user-modifiable data) if the web server can answer two questions: (1) have I seen all requests made by this client since the last cache insert? and (2) has there been a write request made by this client? In order for the servers to answer these questions, they need to know information about the client's request. This information can be stored in a cookie (or other data structure) on the client machine. Once stored, it can be retrieved by the server and used to answer both questions mentioned above. If the web server did not respond to the last request made by the client, then it knows that it has not seen every request made by the client since the last cache insert. If the server has seen every request since the last cache insert, it knows whether a write request has been made. If a write request was made, then it implies the data may have changed since it was cached. If it was discovered that any user-modifiable data could have changed, then the web server should invalidate all cached entries for that client. Otherwise, it is safe to use the data from the cache. To implement the above logic, on a read request each web server will examine the data about the client's previous request. If the last request made by the client is unknown (non-existent or rendered by another host), then the web server should invalidate the cached entries for that client.

In step 102 of FIG. 1, a request is received by one of the front-end servers. The request can be a read request, write request or another type of request. In a web site architecture, for example, a read request could include a HTTP GET request and a write request may include HTTP POST request. In step 104, the front-end server that received the request will make a service call to the back-end service in order to obtain the data or write the data that is the focus of the request. If the request is to read data, the data will be obtained from the back-end service and stored in a local cache for the particular front-end server. If the request received in step 102 is a write request, that data will be written to the back-end service in step 104 and stored in the local cache of the front-end server. In step 106, the front-end server that received the request, will generate a response to that request and send that response to the source of the request. For example, in a web site architecture, the front-end server will generate a web page and send that web page to the client. If the request was a read request, then the data read will be depicted in the result web page. If the request was a write request, the response could include a depiction of the data written or an indication of whether the data was successfully written. In addition, the front-end server will send information about the request to the source of the request. For example, the client that sent the request will receive information about that request in step 106. In one example, that information can be stored in a cookie on the client device. In other examples, other types of data structures (in addition to or different than a cookie) can be used to store the information. Examples of the type of information that can be stored include an identification of the request, an identification of the type of request, a server identification, a user identification, a time stamp, an indication of a version of the data, etc. The information about the request is not limited to any particular set of information. After step 106, there can be a period of time before the next request (see dotted line), or the next request can happen immediately.

In step 108, a front-end server will receive a request from the same client. This may or may not be the very next request after the one received in step 102. The request received in step 108 includes information about the previous request from that client. The previous request is the request that was provided by the client just before the current request. If the current request at step 108 was the next request after the request of step 102, then the information received about the previous request is the same information that was sent to the client at step 106. In one embodiment, the information from the previous request is information stored in a cookie and sent with the request itself. In step 110, the front-end server receiving the request determines whether the current request includes a write operation. If it does, the front-end server will respond to the request in step 112 by performing the write operation. The front-end server will also cause the data in its cache for that client to be invalid and, therefore, will not use the data in the cache when performing the write request.

If, in step 110, it was determined that the current request does not include a write operation (e.g., it is a read operation), then the front-end server will determine whether the previous request was known by the front-end server in step 114. If not, then (in step 116) the server knows that it did not see every request and cannot trust that the data has not been changed. Therefore, the server will respond to the request without using data from the server's cache. Rather, the front-end server will make a service call to the back-end service to obtain the data and use that data to respond to the client in step 116. If the previous request was known by the server, then it can be assumed (if the data in the cache is valid) that the server has known about every request since it added the relevant data to its cache and that every request in the interim was not a write operation; therefore (in step 118), the front-end server will respond to the request using the data in the cache (if the data is in the cache). For data not in the cache, the front-end server can make a service call to the back-end service to obtain the data. The data used to respond to the client in steps 116 and 118 will be stored in the server's cache and information about the request will be sent back to the client to be stored in a cookie or other data structure. When repeating the process of FIG. 1, the current request of steps 108-116 will become the previous request for the next iteration of steps 108-116.

In one embodiment, step 114 will include the front-end server determining whether the previous write request was known by the front-end server currently performing a read operation. The front-end server will not care about the previous read requests and the cookie does not need to be updated for a read request. If the previous write request was known by the front-end server currently performing a read operation, then in step 118, the front-end server responds to the request using data from the cache. If the previous write request was not known by the front-end server currently performing a read operation, then in step 116, the front-end server responds to the request without using the specific data from the cache, by obtaining that data from the back-end service.

There are various architectures for a system that can implement the process of FIG. 1. Examples include distributed computing systems implemented by main frames and client terminals, intranets, web site architectures, etc.

Figure 2:
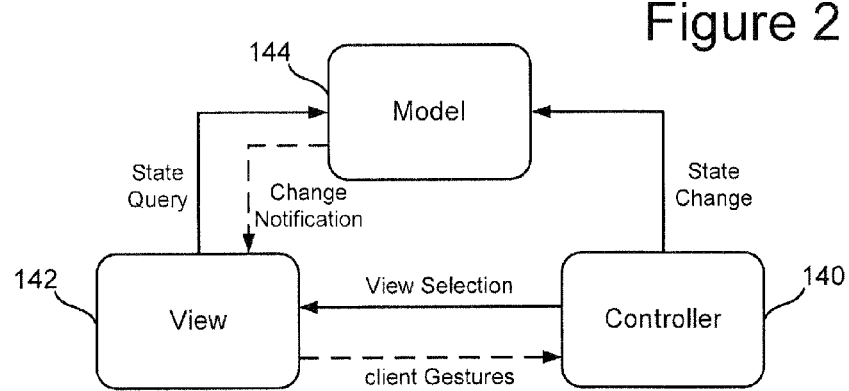
FIG. 2 is a block diagram depicting an architecture for implementing a processing system.

One example of a web site architecture that is suitable for implementing the process of FIG. 1 is the Model-View-Controller (MVC) paradigm that is explained by FIG. 2. This architecture includes Controller 140, View 142 and Model 144, each of which is in communication with one another. Model 144 represents enterprise data and the business rules that govern access to and updates of this data. Often, Model 144 serves as a software approximation to a real world process, where simple real world modeling techniques apply when defining the model. View 142 renders the content of Model 144, accesses enterprise data through Model 144, and specifies how that data should be presented. Controller 140 translates interactions with View 142 into actions to be performed by Model 144. In a stand alone graphical user interface (GUI) client, user interactions could be button clicks or menu selections, whereas in a web application they appear as GET and POST HTTP requests. The actions performed by Model 144 include activating business processes or changing the state of the model. Based on the user interactions and the outcomes of actions, Controller 140 responds by selecting an appropriate view. FIG. 2 shows Controller 140 providing state changes to Model 144 and view selections to View 142. View 142 presents state queries to Model 144 and user gestures to Controller 140. Model 144 can provide change notifications to View 142.

Figure 3:
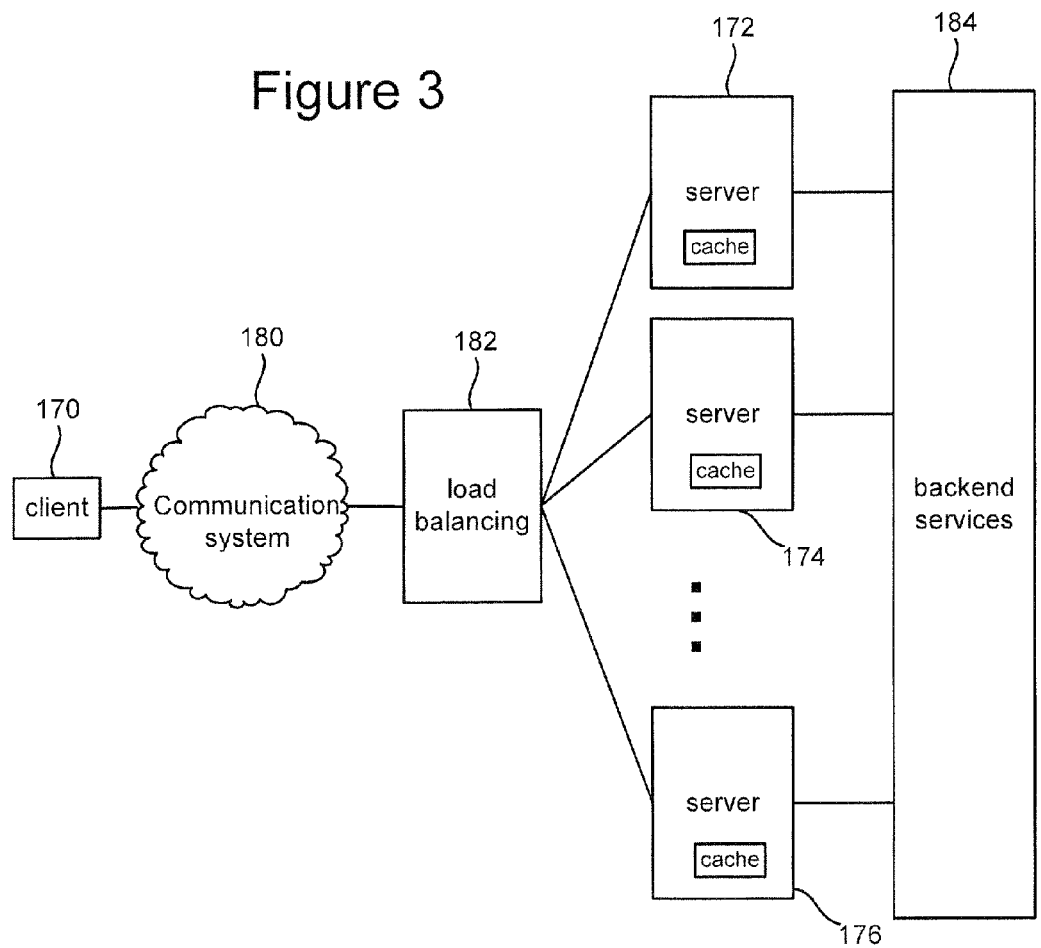
FIG. 3 is a block diagram of one embodiment of a data processing system that uses a cache to improve performance.

FIG. 3 is a block diagram of one example implementation of a distributed data processing system that can make use of the caching technology described herein. In one embodiment, the system of FIG. 3 can implement the architecture of FIG. 2 and the process of FIG. 1. However, the system of FIG. 3 is not required to implement the architecture of FIG. 2, so that other architectures can also be used. The system of FIG. 3 shows client 170 contacting the distributed data processing system via communication system 180. Client 170 can be a personal computer, laptop computer, telephone, smart appliance, other computing device or software process. In one embodiment, communication system 180 is the Internet; however, other communication means can also be used including a WAN, a LAN, wireless communication means, etc. No particular communication means is necessary for the technology described herein. In one embodiment, client 170 will access the distributed data processing system via load balancing device 182, which can distribute the load of requests by any means known in the art. The load balancing device 182 may be for example, a hardware load balancer or a software load balancer. In the instance of a software load balancer it may be implemented on one of the front-end servers 172-176. As an alternative to a typical load balancing device 182, in the example where the system is implemented in a CDN, a client request may be routed to a front-end server 172-176 located at a particular Point of Presence node (POP) through domain name system resolution techniques, such as Anycast. Upon resolution to a POP, the receiving POP may load balance the request among servers 712-176 located within that cache.

Load balancing device 182 communicates with client 170 via communication system 180 and can forward requests to a plurality of front-end servers 172, 174, . . . 176 which comprise the front-end service. In one embodiment, each of the front-end servers 172, 174, . . . 176 are standard web servers known in the art that may or may not be custom configured for the particular implementation. In one embodiment, each of servers 172, 174, . . . 176 includes a cache as described herein. Each of the servers 172, 174, . . . 176 communicate with back-end services 184. In one embodiment, back-end services 184 includes one or more application servers and/or one or more database systems. In one embodiment, back-end services 184 includes five levels of hierarchy of application servers, some of which are in communication with one or more database servers. No one particular hack-end service architecture is required.

Each of the front-end servers 172, 174, . . . 176 includes a cache for locally storing data received from back-end services 184. The access time for a particular server to access data in its cache is much shorter than the access time for obtaining data from back-end services 184. Therefore, the use of the local caches in servers 172, 174, . . . 176 provides an increase in performance for the distributed data processing system of FIG. 3. In one embodiment, front-end servers 172, 174, . . . 176 implement Controller 140 and View 142 of FIG. 2, while back-end services 184 implement Model 144 of FIG. 2. In one example, the components of FIG. 3 implement a retail website; however, other software systems can also be implemented.

FIG. 4 provides one example of data stored in a cache. A typical cache entry can include an invalid/valid flag, a client ID (or customer ID), parameter ID and DATA. Other information can also be stored in the cache. For example, various keys and/or state information can be stored. The invalid/valid flag identifies whether the cache line contains valid data. The client ID is a unique identifier for the client (or customer) whose data is stored on that line of the cache. Some embodiment can store a session ID in addition to or instead of the client ID. The parameter ID identifies the type of parameter (e.g., name, address, shopping cart contents, . . . ). The DATA is the actual data stored for the parameter ID. The technology described herein is not limited to the structure depicted in FIG. 4, and many other types of cache and cache data can be used.

In one embodiment, when the cache fills up, the oldest data is removed first. Additionally, cache data can be removed when it has been in the cache longer than a pre-set period.

FIGS. 5 and 6 are flow charts describing one embodiment of a process for operating the system of FIG. 3 using the cache technology discussed herein. In one embodiment, the processes of FIGS. 5 and 6 are example implementations of the process of FIG. 1. FIG. 5 describes a process performed by a front-end server for responding to a read request. FIG. 6 is a flow chart describing the process performed by the front-end server when receiving a request to write data. The processes of FIGS. 5 and 6 will be repeated each time one of the front-end servers receive a read request or a write request.

In step 200 of FIG. 5, one of the front-end servers 172, 174, . . . 176 receives a request to read data. As discussed above with respect to FIG. 1, a server receiving a request will also receive information about one or more previous requests. In the embodiment of FIG. 5, the information stored about a previous request is the host name of the front-end server that serviced the previous request. In one embodiment, the host name can be encrypted and stored in a cookie. In other embodiments, the host name can be stored encrypted or non-encrypted in other data structures. In step 202, the host name received with the request in step 200 will be compared to the host name for the front-end server that received the request. If the host name received with the request does not match the host name of the server that received the request, then all cache entries for the client sending the request will be invalidated in step 204. For example, the invalid/valid flag of FIG. 4 will be set to invalid for all data having a client 11) matching the client ID included with the request. In other embodiments, a session ID can be used to identify a client. In step 206, the front-end server will obtain the data that is the subject of the read request from back-end services 184 and store that data in its cache. In step 208, the front-end server will prepare a response to the request and send that response in step 210. Additionally, the front-end server will send its host name to the client with the response so that the host name can be stored at the client. For example, the host name can be stored in an encrypted fashion in a cookie.

If, in step 202, it is determined that the host name received with the request matches the host name of the server receiving the request, then the front-end server will access the data in its cache in step 220. If there is valid data in the cache that is the subject of the read request (e.g. cache hit), that data will be read from the cache and used to prepare the response. Even if the host names match, it is possible that the read request will require additional data that was never stored in the cache. In such a case, that data will be obtained from the back-end services 184 in step 222. The data obtained from the back-end services will be stored in the cache upon receipt from back-end services 184. In step 224, the front-end server will prepare a response to the request based on the data from the cache and (possibly) data from the back-end services 187. In step 226, the response will be sent to the client. In this case, the front-end server knows that its host name is already stored in the client, so it does not need to store it again. In some embodiments, for consistency purposes, the front-end server can send the host name again as part of step 226.

FIG. 6 is a flow chart describing the process performed by the front-end server when receiving a request to write data. In step 240 of FIG. 6, the request to write data will be received by the front-end server. In step 242, the front-end server will invalidate all its entries in the cache for that client. If a session ID is used to identify the client, then all data for that session 1D will be invalidated. In step 244, the data to be written will be provided to the back-end service 184 in order to have back-end service 184 write the date into the database or other data structure. In step 246, a response to the write request will be provided back to the client. For example, an operation success or operation failure status can be provided, as well as the data written. In step 248, the host name for the front-end server that stores the data will be sent to the client. Additionally, the data written will be stored in the cache. In some embodiments, the data of a write request will not be written to the cache.

FIGS. 7-9 provide another embodiment for operating the system of FIG. 3. In this embodiment, rather than storing the host name on the client, a version ID (VID) is stored on the client.

FIG. 7 provides an example of data stored in a cache, including a VID, a client ID, parameter ID and DATA. In some embodiments, a session ID can also be stored in the cache. In one embodiment, the VID is used as a key for the cache. In one example, the VID is the output of a counter. Each time the data in the back-end services 184 is edited, the counter is incremented by one. Thus, when data is obtained from back-end services 184, back-end services 184 will also provide the latest VID with the data so that the data and the VID can be stored in the cache. In other embodiments, the VID can be a random number or other unique identifier, rather than a counter. In some embodiments, the VID can be used in combination with the session ID and parameter ID as a key to the cache.

FIG. 8 is a flow chart describing one embodiment of a process for responding to a read request using the caching technology with the system of FIG. 3. FIG. 9 is a flow chart describing one embodiment of a process for responding to a write request using the caching technology with the system of FIG. 3.

In step 302 of FIG. 8, the front-end server will receive a request to read data. That request will include a VID. For example, the VID could be stored in a cookie and provided with an HTTP GET command. In step 304, the front-end server will use the VID to access the appropriate line of the cache using the VID as the key to the cache. If there is no matching VID in the cache, then there is no hit (e.g. cache miss). In step 320, the front-end server will obtain the requested data from back-end services 184. In step 322, that data will be stored in the cache. Additionally, the VID for that data will also be stored in the cache. In step 324, the front-end server will prepare a response to the request. In step 326, the prepared response will be sent to the client. In step 328, the VID will also be sent to the client (either with the response or separately from the response) for storage at the client. For example, the VID can be stored in a cookie or other data structure within the client's computing device.

If, in step 304, the VID was found in the cache (a cache hit), then the data from the cache will be read in step 306. In optional step 308, any data required by the request that is not in the cache will also be obtained from the back-end services and stored in the cache. In step 310, the response to the request is prepared based on the data from the cache (and maybe from the back-end services). In step 312, the prepared response (including the VII)) is sent to the client. In some embodiments of step 312, the VID is not sent because the cookie already contains the most recent VID.

FIG. 9 is a flow chart describing one embodiment performed by a front-end server in response to a request to write data. In step 360, the request to write data is received by the front-end server. In step 362, the data is written using back-end service 184. In step 364, the VID is updated. For example, if the VID is a counter, the counter is incremented. In one embodiment, the VID is updated by back-end services 184. In other embodiments, other components can update the VID. In step 366, a response is generated and sent to the client. In step 368, the VID is sent to the client for storage at the client.

In one embodiment, one VID is used for all data for a particular client or one VID for all data for a particular session. In other embodiments, there can be separate VIDs for each type of service. For example, user identity data can have one VID, history data can have another VID, shopping cart data can have another VID, etc. When using separate VIDs for each service, each VID can be a separate data element. Alternatively, the multiple VIDs can be concatenated into one array of VIDs. In other embodiments, a VID can be associated with an array of bits where each bit in the array indicates which service the VID is valid for. Other variations of a VID can also be used.

In one embodiment, the processes of FIGS. 8 and 9 are implementations of the process of FIG. 1. A server will know about an appropriate previous request that changed the data based on whether there is a match with the VID for that data.

Figure 10:
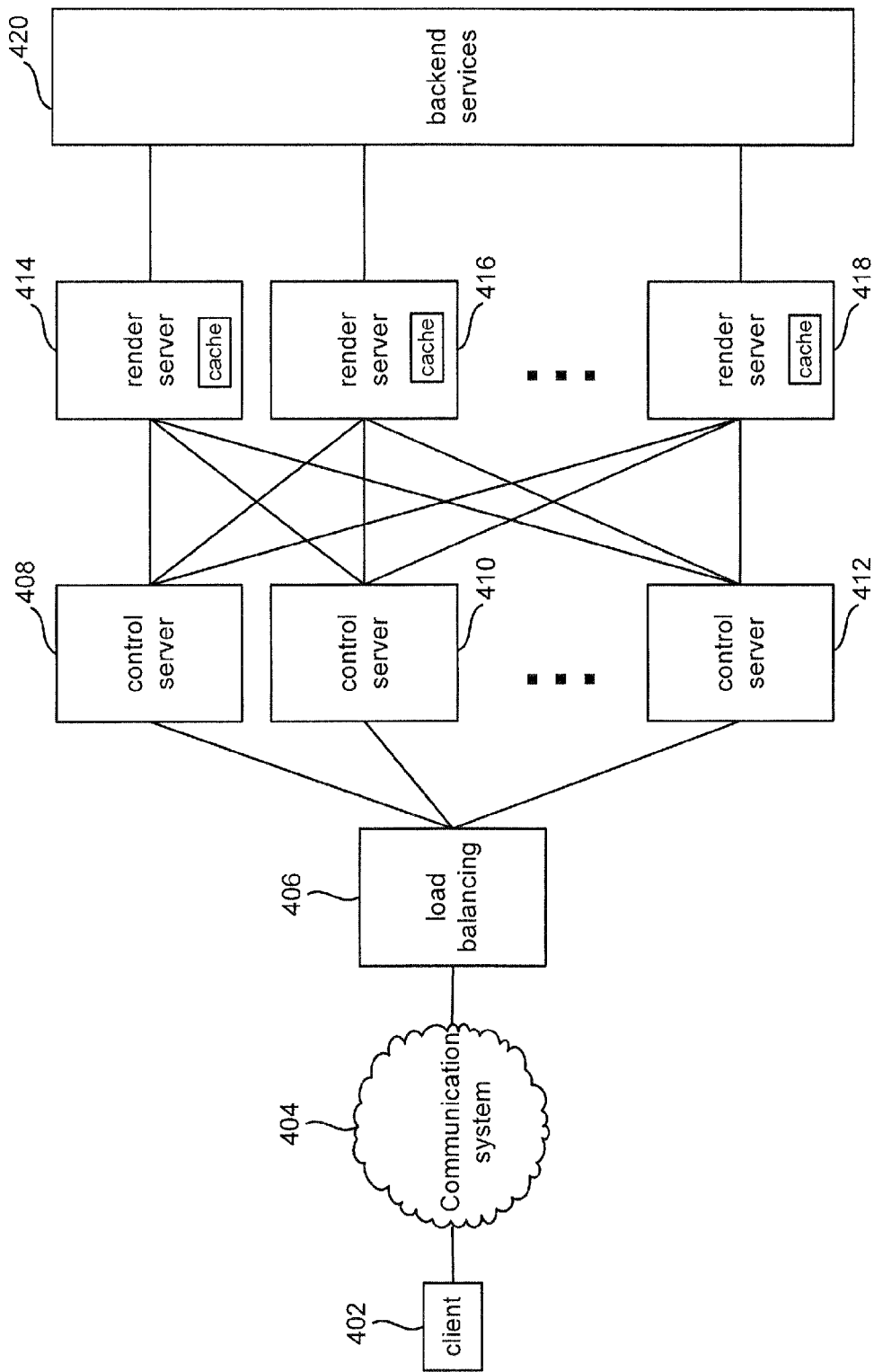
FIG. 10 is a block diagram of one embodiment of a data processing system that uses a cache to improve performance.

FIG. 10 provides a block diagram of a second embodiment of a distributed data processing system that can implement the technology for caching as described herein. In one example, the system of FIG. 10 can implement the architecture of FIG. 2. In other examples, the system of FIG. 10 can implement other architectures. FIG. 10 shows client device 402 connected to communication system 404. In one embodiment, communication system 404 is the Internet; however, other communication means can be used including LAN, WAN, wireless communication, etc. Clients (via communication system 404) will access the distributed data processing system through load balancing device 406, which is in communication with a plurality of control servers 408, 410 . . . 412. In one embodiment, the control servers implement the functionality of Controller 140 of FIG. 2. Each of the control servers are in communication with a set of render servers 414, 416 . . . 418. Render servers 414, 416, . . . 418 are in communication with backend services 420 and each include a cache as described herein. In one embodiment, each of the render servers implement the functionality of View 142 of FIG. 2 and one or more servers and one or more databases of the back-end services 420 implement the functionality of Model 144 of FIG. 2. Note that in one embodiment, back-end services 420 comprises five levels of servers and one or more database systems implementing various functions to operate a retail web site or other software system.

In the embodiment of FIG. 10, a request for data is received by one of the control servers 408, 410 . . . 412. That control server will determine which page to create in response. However, rather than create the entire page, the particular control server will then contact one or more render servers 414, 416 . . . 418 and give each render server a task to generate a portion of the resulting web page. Render servers 414, 416, . . . 418 will either use data in their cache or data from back-end services 420 to render the appropriate portions of the result web page and send those portions to the appropriate control server. The control server will then assemble the portions of the web page from the render servers and provide that web page to the client in response to the request. In some embodiments, control servers 408, 410, . . . 412 may also include caches for storing local copies of the data.

Figure 11:
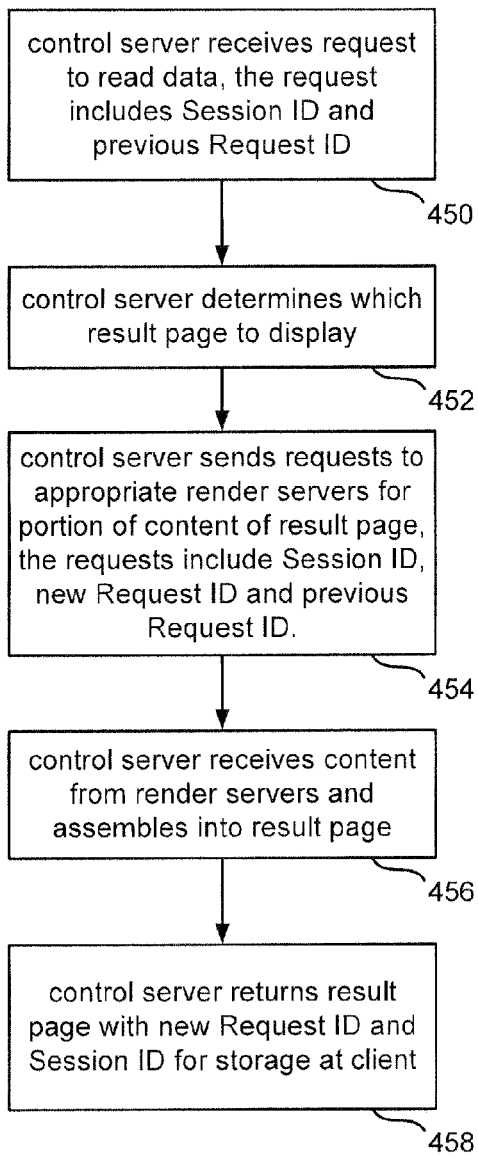
FIG. 11 is a flow chart describing one embodiment of a process performed by a control server to respond to a request to read data.
Figure 12:
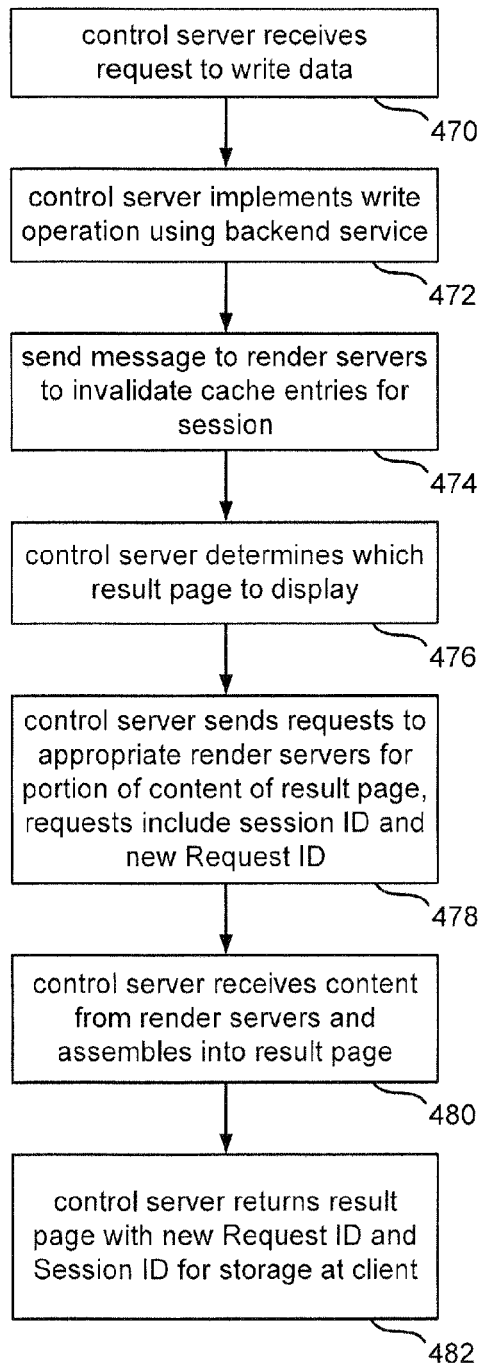
FIG. 12 is a flow chart describing one embodiment of a process performed by a control server to respond to a request to write data.

FIGS. 11 and 12 provide flow charts describing the operation of control servers 408, 410 . . . 412 in response to read and write requests. The embodiment of FIGS. 11 and 12 assumes that the information about the previous request stored on the client comprises a request ID. In one embodiment, the request ID is a number, set of letters, one or more symbols, or any combination of the above, that uniquely identifies a request. In one embodiment, every time a new page is loaded in a browser, that browser will receive a new unique request ID. The embodiment of FIGS. 11 and 12 also makes use of a session ID. That is when a user contacts the software system, that user is assigned a session ID. That session ID will be stored in the user's cookie (or other data structure), and all requests from the user will include that session ID. In some embodiments, the session ID will remain valid until the user logs out or the session ID times out. Each request received from the user will include a session ID and a request ID. A session ID can be bound to a user account when the user logs in or otherwise authenticates. When the session ID is not bound to a user account, then data can be cached based on session ID and request ID. The cache structure of FIG. 4 can be used with the client ID being replaced by session. ID. Each server will store a list of request ID/session ID tuples that contain the last request ID served for each session ID.

FIG. 11 is a flow chart describing one embodiment of the process performed by a control server when receiving a read request. In step 450, a request to read data is received by the control server. The request includes a session ID and the previous request ID. In step 452, the control server determines which result to display. In step 454, the control server sends requests to the appropriate subset of render servers for portions of content of the result page. These requests to the render servers include the session ID, the new request ID, and the previous request ID. In step 456, the control server receives content from each of the render servers and a portion of the web page rendered by each respective render server. That content is assembled into a result page. In step 458, the control server returns the result page with the new request ID and the existing session ID to the client. As explained above, in one embodiment, the request ID and session ID are stored in the client's cookie.

FIG. 12 is a flow chart describing one embodiment of the process performed by the control server in response to a request to write data. In step 470, the control server receives a request to write data. In step 472, the control server implements the write operation using back-end services 420. In step 474, control server will send a message to one or more of the render servers to invalidate cache entries for the particular session ID. In step 476, control server determines which result page to display. In step 478, the control server sends a request to the appropriate render servers to render a portion of the content of the results page. That request may include the session ID and a new request ID. The control server will then receive the content from the render servers and assemble that content into a result page. In step 482, the control server returns the result page with the new request ID and session ID for storage at the client.

FIG. 13 is a flow chart describing one embodiment of a process performed by a render server of FIG. 10 in conjunction with the processes of FIGS. 11 and 12. In step 502, the render server will receive a request from the control server to render content. The message with the request from the control server will include session ID, current request ID, and the previous request ID. The render server will compare the session ID and previous request ID to the session ID/request ID tuples stored locally for that render server. If there is no match (step 506), then in step 510 all cache entries for that particular session ID will be invalidated. If the session ID was bound to the customer ID (or client ID), then the cache entries for the client can be invalidated in step 510. In step 512, the data for the request is obtained from back-end services 420. In step 514, the content requested by the control server is rendered based on data from the back-end services, and not based on data in the cache. In step 516, the rendered content is sent to a control server. In step 518, the session ID/request ID data structure of tuples is updated to reflect the new request ID.

If, in step 506, there was a match between the previous request ID and the local data structure of pairs of session ID/request ID tuples, then in step 530 valid data is read from the cache. In step 532, any additional data not found in the cache can be obtained from back-end services 420. Step 532 is optional. In step 534, the requested content is rendered based on the data from the cache and (optionally) data from the back-end services. In step 536, the rendered content is sent to the control server. In step 538, the data structure of session ID/request ID tuples is updated to store the newest request ID. In one embodiment, the processes of FIGS. 11-13 are implementations of the process of FIG. 1.

Figure 16:
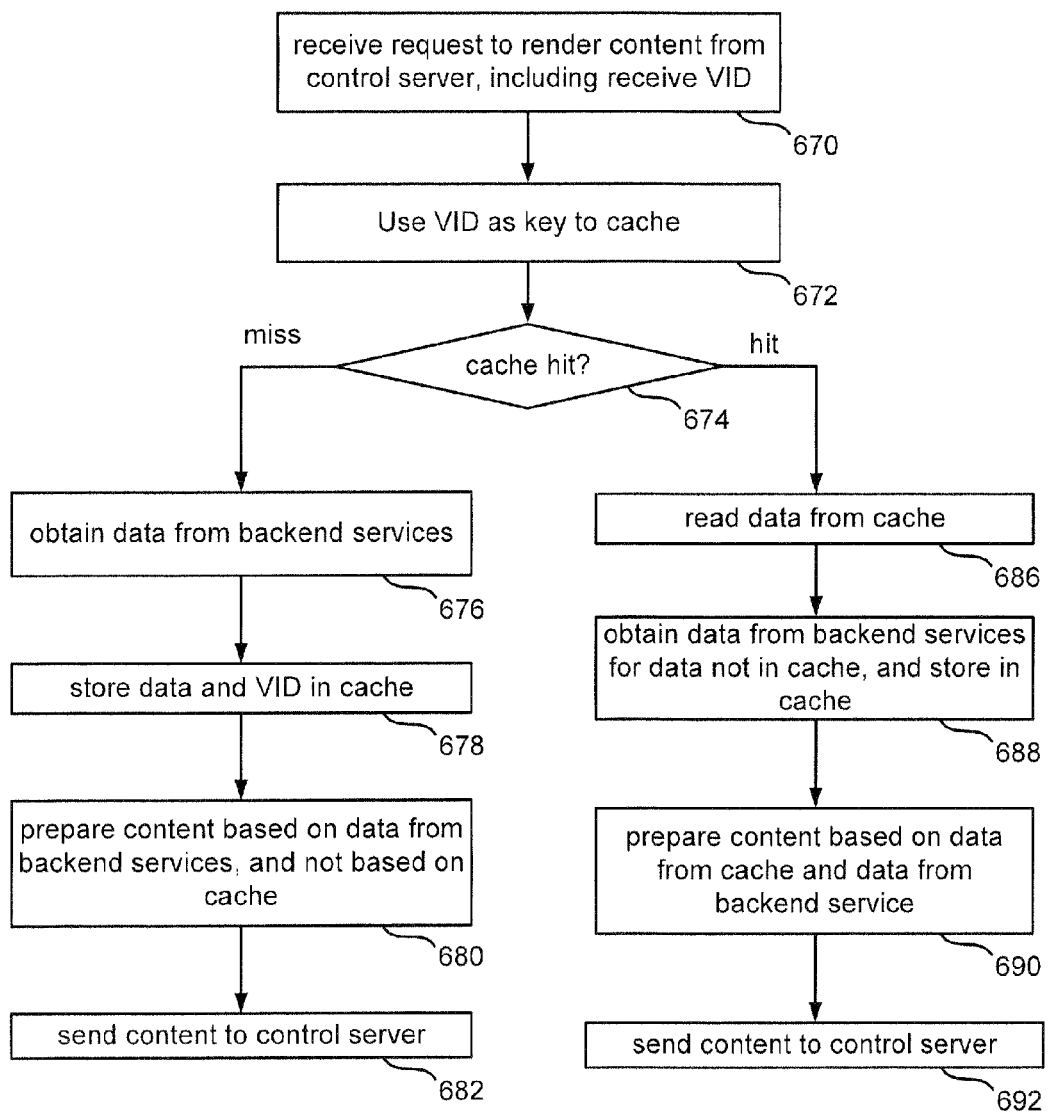
FIG. 16 is a flow chart describing one embodiment of a process performed by a rendering server to respond to a request to read data.

FIGS. 14-16 describe an embodiment for operating the components of FIG. 10 that utilizes the VID discussed above. FIG. 14 describes the operation of control server in response to a request to read data. In step 602, the control server receives a request to read data. That request includes a session ID and the previous VID. In step 604, the control server determines which result page to display. In step 606, the control server sends a request to the appropriate one or more render servers for those appropriate servers to render a portion of the content in the result page. That request to the render servers includes a session ID and VID. The control server then receives the content from the render servers and assembles that content into a result page as part of step 608. The control server will return the result page to the user in step 610, including returning the VID and session ID to the client.

FIG. 15 is a flow chart describing one embodiment for the control server operation in response to a request to write data. In step 640, the control server receives a request to write data. In step 642, the control server implements the write operation using back-end service 420. In step 644, the control server will update the VID. In one embodiment, the VID is updated by the back-end service 420. In step 646, control server determines which result page to display. In step 648, the control server sends a request to the appropriate one or more render servers for those servers to render a portion of the content of the results page. Those requests to the render servers include the VID. In step 650, the control server receives the content from the various render servers and assembles that content into a results page. In step 652, the control server returns a result page with a new VID to the client.

FIG. 16 is a flow chart describing the operation of the render server in response to the control server. In step 670 of FIG. 16, a render server receives a request to render content (a portion of a web page or other GUI) from the control server. The received request to render content includes the VID and the session ID. In step 672, the VID is used as a key to the cache to find the appropriate lines of data in the cache. In step 674, it is determined whether there was a hit (e.g., did the VID match any of the keys in the cache). If there was no hit (e.g., cache miss), then at step 676 the requested data is obtained from the back-end services 420. In step 678, the data obtained from back-end services and the latest VID (also obtained from back-end services) is stored in the local cache. In step 680, the render server will prepare the requested content based on the data received from the back-end services, and not based on data in the cache. In step 682, the content rendered is sent to the control server.

If the VID did match a key in the cache (e.g., cache hit), then in step 686, the appropriate data is read from the cache. If there is additional data requested that is not found in the cache, that data will be obtained from back-end services as part of step 688. In step 690, the requested content is prepared based on the data from the cache and (optionally) data from the back-end service. In step 692, the rendered content is sent to the control server.

In one embodiment, the processes of FIGS. 14-16 are implementations of the process of FIG. 1. A server will know about an appropriate previous request that changed the data based on whether there is a match with the VID for that data.

In some embodiments, each (or a subset) of the servers can have their own caches and operate as discussed above. In other embodiments, a cache (or cluster) can be in communication with and used by multiple front end servers. In such a case, the process for determining whether the previous request was known would be performed for or by the shared cache. The system would be determining whether the cache instance that is now being read from observed the last write or knows the current VID. If so, then it is safe to use the data in the cache. As long as the next request came into a host that referenced that cache (or cluster) it would still be valid to use cached data.

FIG. 17 provides one example operation of any of the systems and/or processes described above. In step 740, a first read request from a client is received at server A. Server A can be any of servers 172, 174, . . . 176 of FIG. 3. Alternatively, the first read request can be received at one of the control servers of FIG. 10 and then portions of the request are parsed out and sent to the various render servers. If this is a first time a request is received from the client, the data is obtained from the back-end services, the data is stored in the one or more appropriate local caches, and the appropriate information (host name, session ID, request ID, VID, etc.) is stored in the cookie (or other data structure). Step 740 can be implemented by the processes of FIG. 5, FIG. 8, FIG. 11 in combination with FIG. 13, or FIG. 14 in combination with FIG. 16.

In step 742 of FIG. 17, a second read request from the same client is received at server A. This time, the data will be obtained from the cache and reported back to server A, with the appropriate information stored in the cookie. The processes of step 742 can be implemented by the processes of FIG. 5, FIG. 8, FIG. 11 in combination with FIG. 13, or FIG. 14 in combination with FIG. 16.

In step 744 of FIG. 17, a third read request is received at server B (which is different than server A) from the same client. In this case, server B will not match the host name, will not already have the request ID stored, or will not have the appropriate VID stored. Therefore, server B will not know about the previous request. As a result, server B will have to obtain the data from the back-end services. After obtaining the data, server B will update its cache and store the appropriate information in the cookie. The processes of step 744 can be performed using the processes of FIG. 5, FIG. 8, FIG. 11 in combination with FIG. 13, or FIG. 14 in combination with FIG. 16.

In step 746, a fourth read request is received at server A from the same client. In this case, server A did not know about the last request since the last request went to server B. As such, the host name will be different or the request ID will be different. Therefore, the data in the cache will be invalidated and server A will have to go to the back-end services to get the data. The processes of step 746 can be performed by the methods of FIG. 5, FIG. 8, FIG. 11 in combination with FIG. 13, or FIG. 14 in combination with FIG. 16. In some embodiments, it is possible that the VID would not have changed for step 746; therefore, server A may still be able to use the data in the cache.

FIG. 18 is a flow chart describing another example. In step 760, a first read request from a client is received at server A. Because this is the first read request received at server A, data is obtained from the back-end, stored in the cache and provided to the client. In addition, the appropriate information is stored in the cookie for the client. The process of step 760 is similar to the process of step 740. In step 762, a second read request from the client is received at server A. Step 762 is the same as step 742 of FIG. 17. In step 764, a write request from the same client is received at server B. As a result of the write request, server B will invalidate the data in its cache (flipping an invalid/valid bit or changing the VID), write the data to the back-end services database, and provide the appropriate results to the client (including storing the appropriate information in the cookie). Step 764 can be implemented using the processes of FIG. 6, FIG. 9, FIG. 12 in combination with FIG. 13, or FIG. 15 in combination with FIG. 16. In step 766, a third read request from the client is received at server A. In this case, the information received in the cookie will not match the information served by server A. Therefore, the data in the cache will be invalidated and the data to be read will be obtained from the back-end service. Step 766 can be performed using the processes of FIG. 5, FIG. 8, FIG. 11 in combination with FIG. 13 or FIG. 14 in combination with FIG. 16. In step 768, a fourth read request from the client is received at server A. In response to this request, server A will obtain the request data the from its cache and will send a response using the data from its cache. The appropriate information discussed above will be stored in the cookie. The processes of step 742 can be implemented by the processes of FIG. 5, FIG. 8, FIG. 11 in combination with FIG. 13, or FIG. 14 in combination with FIG. 16.

Figure 19:
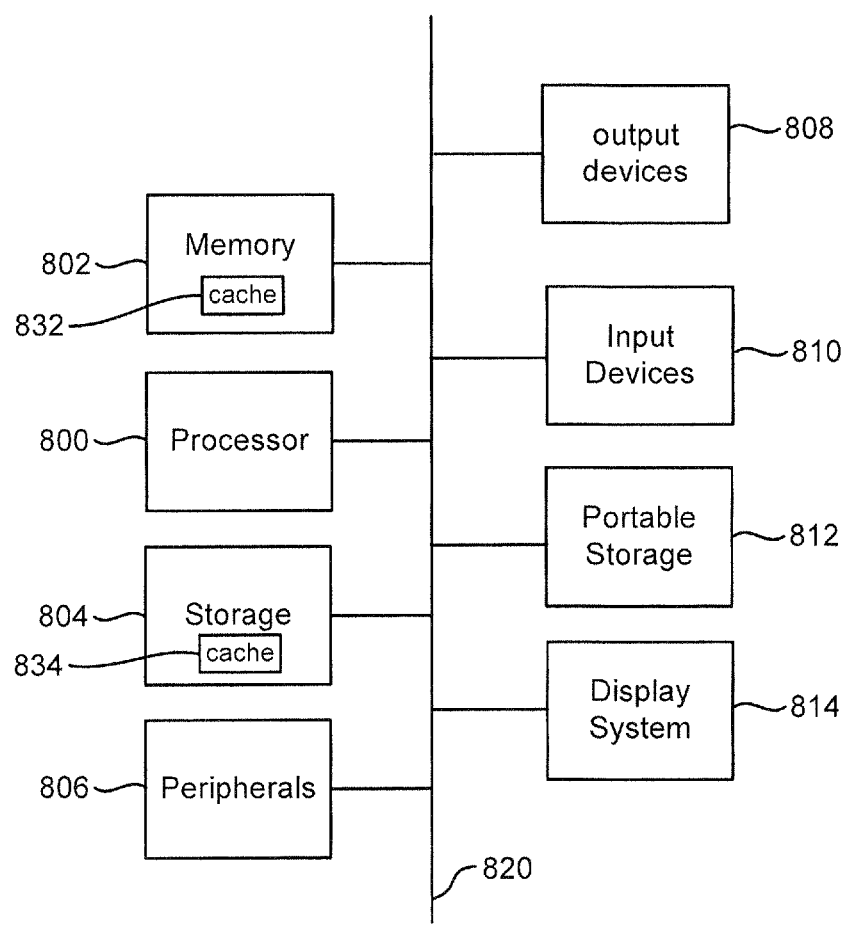
FIG. 19 is a block diagram of one embodiment of a computing system that can be used to implement the technology described herein.

FIG. 19 is a high level block diagram of the computing system which can be used to implement any of the computing devices of FIG. 3 or FIG. 10. The computing system of FIG. 19 includes processor 800, memory 802, mass storage device 804, peripherals 806, output devices 808, input devices 810, portable storage 812, and display system 814. For purposes of simplicity, the components shown in FIG. 19 are depicted as being connected via single bus 820. However, the components may be connected through one or more data transport means. In one alternative, processor 800 and memory 802 may be connected via a local microprocessor bus, and the mass storage device 804, peripheral device 806, portable storage 812 and display system 814 may be connected via one or more input/output buses.

Processor 800 may contain a single microprocessor, or may contain a plurality of microprocessors for configuring the computer system as a multiprocessor system. Memory 802 stores instructions and data for execution by processor 800. If the technology described herein is wholly or partially implemented in software, memory 802 (which may include one or more memory devices) will store the executable code for programming processor 800 to perform the processes described herein. In one embodiment, memory 802 may include banks of dynamic random access memory, high speed cache memory, flash memory, nonvolatile memory, or other storage elements. A portion 832 of memory 802 is used to implement the cache discussed above. Data will be stored in cache 832 in order to increase performance using the processes described herein.

Mass storage device 804, which may be implemented with a magnetic disc drive or optical disc drive, is a nonvolatile storage device for storing data and instructions for use by processor 800. In one embodiment, mass storage device 804 stores the system software that implements the technology described herein for purposes of loading to main memory 802. Rather than implementing the cache is memory 802, some embodiments may implement the cache in a portion 834 of mass storage device 804. Some implementations can implement the cache in both memory 802 and mass storage device 804. Some other implementations can implement the cache in other components of the computing system.

Portable storage device 812 operates in conjunction with a portable nonvolatile storage medium, such as a floppy disc, CD-RW, flash memory card/drive, etc., to input and output data and code to and from the computer system of FIG. 19.

In one embodiment, system software for implementing the present invention is stored on such a portable medium, and is input to the computer system via portable storage medium drive 812.

Peripheral devices 806 may include any type of computer support device, such as an input/output interface, to add additional functionality to the computer system. For example, peripheral devices 806 may include a network interface for connecting the computer system to a network, a modem, a router, a wireless communication device, etc. Input devices 810 provides a portion of a user interface, and may include a keyboard, or pointing device (e.g. mouse, track ball, etc.). In order to display textual and graphical information, the computer system of FIG. 19 will (optionally) have an output display system 814, which may include a video card and monitor. Output devices 808 can include speakers, printers, network interfaces, etc.

The components depicted in the computer system of FIG. 19 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method for caching data, comprising:
receiving, from a first client device, a first request to read data from a cache, the first request including a first version identification (VID);
using the first VID received from the first client device as a first key, determining if a matching first key for the requested data exists in the cache, the matching first key comprising a matching first VID;
determining that the matching first key for the requested data exists in the cache;
obtaining at least a portion of the requested data from the cache and sending a reply to the first client device, the reply including the at least a portion of the requested data and the matching first VID for the requested data;
receiving, from a second client device, a second request to read second data from the cache, the second request including a second version identification (VID), the second VID used as a second key;
determining that a matching second key for the requested second data received from the second client device was not found in the cache; and
obtaining the requested second data from a different entity, storing the requested second data in the cache, and sending the requested second data to the second client device.

2. The method of claim 1, further comprising storing a third version identification (VID) in the cache, the third VID associated with the second data requested by the second client device.

3. The method of claim 2, further comprising sending to the second client device the third VID associated with the second data requested by the second client device.

4. The method of claim 1, further comprising obtaining any portion of the requested data not found in the cache from the different entity and storing the portion of the requested data in the cache in response to determining that the matching first key for the requested data exists in the cache.

5. The method of claim 4, further comprising obtaining a latest VID from the different entity and storing the latest VID and the obtained portion of the requested data in the cache.

6. A non-transitory computer readable storage medium storing a plurality of instructions for controlling a computer system to cache data, which when executed cause the computer system to:
receive, from a first client device, a first request to read data from a cache, the first request including a first version identification (VID);
use the first VID received from the first client device as a first key to determine if a matching first key for the requested data exists in the cache, the matching first key comprising a matching first VID;
determine that the matching first key for the requested data exists in the cache;
obtain at least a portion of the requested data from the cache and send a reply to the first client device, the reply including the at least a portion of the requested data and the matching first VID for the requested data;
receive, from a second client device, a second request to read second data from a cache, the second request including a second version identification (VID), the second VID used as a second key;
determine that a matching second key for the requested second data was not found in the cache; and
obtain the requested second data from a different entity, store the requested second data in the cache, and send the requested second data to the second client device.

7. The non-transitory computer-readable storage medium of claim 6, the instructions further configured to store a third version identification (VID) in the cache, the third VID associated with the second data requested by the second client device.

8. The non-transitory computer-readable storage medium of claim 7, the instructions further configured to send to the second client device the third VID associated with the second data requested by the second client device.

9. The non-transitory computer-readable storage medium of claim 6, the instructions further configured to obtain any portion of the requested data not found in the cache from the different entity and storing the portion of the requested data in the cache in response to determining that the matching first key for the requested data exists in the cache.

10. A computer system for caching data, comprising:
one or more processors; and
memory including instructions that, when executed by the one or more processors, cause the system to:
receive, from a first client device, a first request to read data from a cache, the first request including a first version identification (VID);
using the first VID received from the first client device as a first key, determine if a matching first key for the requested data exists in the cache, the matching first key comprising a matching first VID
determine that the matching first key for the requested data exists in the cache;
obtain at least a portion of the requested data from the cache and send a reply to the first client device, the reply including the at least a portion of the requested data and the matching first VID for the requested data;

receive, from a second client device, a second request to read second data from a cache, the second request including a second version identification (VID), the second VID used as a second key;

determine that a matching second key for the requested second data was not found in the cache; and obtain the requested second data from a different entity, storing the requested second data in the cache, and sending the requested second data to the second client device.

11. The system of claim 10, the instructions further causing the system to store a third version identification (VID) in the cache, the third VID associated with the second data requested by the second client device.

12. The system of claim 11, the instructions further causing the system to send to the second client device the third VID associated with the second data requested by the second client device.

13. The system of claim 10, the instructions further causing the system to obtain any portion of the requested data not found in the cache from the different entity and store the portion of the requested data in the cache in response to determining that the matching first key for the requested data exists in the cache.

14. The system of claim 13, the instructions further causing the system to obtain a latest VID from the different entity and store the latest VID and the obtained portion of the requested data in the cache.

* * * * *